US010914175B2

(12) United States Patent
Okabe et al.

(10) Patent No.: US 10,914,175 B2
(45) Date of Patent: Feb. 9, 2021

(54) COMPOSITE BLADE, METALLIC LEADING-EDGE COVER FORMING UNIT, METHOD FOR MANUFACTURING COMPOSITE BLADE

(71) Applicant: MITSUBISHI HEAVY INDUSTRIES, LTD., Tokyo (JP)

(72) Inventors: Ryoji Okabe, Tokyo (JP); Masami Kamiya, Tokyo (JP); Kentaro Shindo, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 120 days.

(21) Appl. No.: 16/295,747

(22) Filed: Mar. 7, 2019

(65) Prior Publication Data

US 2019/0277142 A1   Sep. 12, 2019

(30) Foreign Application Priority Data

Mar. 9, 2018   (JP) .................................. 2018-042943

(51) Int. Cl.
*F01D 5/14*   (2006.01)
*F01D 25/00*   (2006.01)
(Continued)

(52) U.S. Cl.
CPC .............. *F01D 5/147* (2013.01); *B29C 65/48* (2013.01); *B29C 66/721* (2013.01);
(Continued)

(58) Field of Classification Search
CPC .......... F01D 5/147; F01D 5/288; F01D 5/282; F01D 5/286; F01D 25/007;
(Continued)

(56) References Cited

U.S. PATENT DOCUMENTS

| 4,022,587 | A | * | 5/1977 | Wlodek | .................. C23C 30/00 |
| | | | | | 420/443 |
| 4,943,485 | A | * | 7/1990 | Allam | ....................... C23C 8/10 |
| | | | | | 428/457 |
| 8,088,498 | B2 | * | 1/2012 | Smith | ..................... F01D 5/288 |
| | | | | | 428/678 |
| 10,207,283 | B2 | * | 2/2019 | Miki | ........................ F01D 5/28 |

(Continued)

FOREIGN PATENT DOCUMENTS

| JP | 62-165508 | | 7/1987 | |
| JP | S62165508 | * | 7/1987 | ............... F01D 5/28 |
| JP | 2016-138550 | | 8/2016 | |

OTHER PUBLICATIONS

Office Action dated Jan. 8, 2020 in corresponding Japanese Patent Application No. 2018-042943, with English-language translation.

*Primary Examiner* — Brian P Wolcott
(74) *Attorney, Agent, or Firm* — Wenderoth, Lind & Ponack, L.L.P.

(57) ABSTRACT

A composite blade includes a composite blade body including reinforced fibers and resin; a metal layer provided on an outer side of a leading edge section including a leading edge that is a part of the composite blade body on an upstream side of an air stream, the metal layer having a thickness of equal to or larger than 5 micrometers and equal to or smaller than 100 micrometers; an adhesive layer provided between the composite blade body and the metal layer to bond the metal layer to the composite blade body; and an electric insulating layer provided in contact with a surface of the leading edge section of the composite blade body, the surface being on the side on which the metal layer is provided, the electric insulating layer having an electric insulating property.

5 Claims, 7 Drawing Sheets

(51) Int. Cl.
  *F01D 5/28* (2006.01)
  *B29C 65/48* (2006.01)
  *B29C 65/00* (2006.01)
  *B29L 31/08* (2006.01)

(52) U.S. Cl.
  CPC ...... *B29C 66/7314* (2013.01); *B29C 66/7428* (2013.01); *F01D 5/282* (2013.01); *F01D 5/286* (2013.01); *F01D 5/288* (2013.01); *F01D 25/007* (2013.01); *B29K 2995/0007* (2013.01); *B29L 2031/082* (2013.01); *F05D 2220/32* (2013.01); *F05D 2230/21* (2013.01); *F05D 2240/303* (2013.01); *F05D 2260/95* (2013.01); *F05D 2300/132* (2013.01); *F05D 2300/16* (2013.01); *F05D 2300/17* (2013.01)

(58) Field of Classification Search
  CPC ........... F05D 2240/303; F05D 2260/95; F05D 2300/17; F05D 2300/132; F05D 2300/16
  See application file for complete search history.

(56) References Cited

U.S. PATENT DOCUMENTS

| | | | |
|---|---|---|---|
| 10,259,169 B2 * | 4/2019 | Godon | B29C 45/14008 |
| 10,815,797 B2 * | 10/2020 | Karlen | F01D 5/282 |
| 2011/0211967 A1 * | 9/2011 | Deal | F04D 29/324 |
| | | | 416/224 |
| 2015/0086376 A1 * | 3/2015 | Fandrei, II | F01D 5/28 |
| | | | 416/224 |
| 2015/0151485 A1 | 6/2015 | Dodon et al. | |
| 2016/0208615 A1 | 7/2016 | Li et al. | |

* cited by examiner

COMPOSITE BLADE, METALLIC LEADING-EDGE COVER FORMING UNIT, METHOD FOR MANUFACTURING COMPOSITE BLADE

CROSS-REFERENCE TO RELATED APPLICATIONS

The present application claims priority to and incorporates by reference the entire contents of Japanese Patent Application No. 2018-042943 filed in Japan on Mar. 9, 2018.

FIELD

The present invention relates to a composite blade, a metallic leading-edge cover forming unit, and a method for manufacturing a composite blade.

BACKGROUND

Having been used as a rotor blade or a stationary vane is a composite blade body formed by laminating layers of composite material that is impregnation of reinforced fibers with resin. For example, disclosed as a structure for a composite blade body that is used as a fan blade of an aircraft engine is a structure in which a massive metallic leading-edge cover member is bonded to a leading edge section including the leading edge of the composite blade body, as a countermeasure for a bird strike or sand ingestion (see Patent Literature 1).

CITATION LIST

Patent Literature

Patent Literature 1: Japanese Unexamined Patent Application Publication No. 2016-138550

SUMMARY

Technical Problem

Meanwhile, a composite blade body used in an industrial gas turbine compressor is required to have some countermeasure for water droplet erosion, because some gas turbine compressors are designed to spray water droplets for cooling the suctioned air. As a countermeasure for water droplet erosion, a metallic material with a high corrosion resistance and fatigue strength, e.g., titanium alloy, is suitable. However, a metallic material such as titanium alloy is hard to work with, and it is difficult to process the material to a shape fitting the shape of the leading edge section of the composite blade body that is used in an industrial gas turbine compressor, because the leading edge section of such a composite blade body is very thin, and has a complicated curved surface. Therefore, it has been quite difficult, from the viewpoints of manufacturability and manufacturing costs, to manufacture a leading-edge cover member as a countermeasure for water droplet erosion of the composite blade body used in an industrial gas turbine compressor, using the method disclosed in Patent Literature 1.

Furthermore, the energy of the water droplets colliding with the composite blade body that is used in an industrial gas turbine compressor is extremely low, compared with the energy of a bird strike or sand ingestion applied to the composite blade body that is used as a fan blade of an aircraft engine. Therefore, manufacturing a leading-edge cover member as a countermeasure for water droplet erosion of a composite blade body used in an industrial gas turbine compressor using the method disclosed in Patent Literature 1 is excessive as a design from the viewpoint of the collision resistance, and may result in a reduced lightness, which is an advantage of the composite blade body used in an industrial gas turbine compressor, disadvantageously.

The present invention is made in consideration of the above, and an object of the present invention is to provide a composite blade, a metallic leading-edge cover forming unit, a method for manufacturing a composite blade that can also be suitably used as a countermeasure for water droplet erosion of a composite blade body that is used in an industrial gas turbine compressor.

Solution to Problem

To solve the above problems and achieve the object, a composite blade includes a composite blade body including reinforced fibers and resin; a metal layer provided on an outer side of a leading edge section including a leading edge that is a part of the composite blade body on an upstream side of an air stream, the metal layer having a thickness of equal to or larger than 5 micrometers and equal to or smaller than 100 micrometers; and an adhesive layer provided between the composite blade body and the metal layer to bond the metal layer to the composite blade body.

With such a configuration, because the metal layer that has a high corrosion resistance and fatigue strength, that is light-weighted, and that has a shape following the leading edge section of the composite blade body is bonded to the leading edge section of the composite blade body via the adhesive layer, it is possible to acquire a composite blade that can be suitably used as a countermeasure for water droplet erosion of a composite blade body that is used in an industrial gas turbine compressor. Furthermore, the presence of the adhesive layer having an electric insulating property can suppress the electrical erosion of the metal layer.

In this configuration, it is preferable that the composite blade further includes an electric insulating layer provided in contact with a surface of the leading edge section of the composite blade body, the surface being on the side on which the metal layer is provided, and the electric insulating layer has an electric insulating property. In addition, it is preferable that the electric insulating layer is an insulating glass fiber layer. With such a configuration, because the electric insulating layer electrically insulates the metal layer from the leading edge section of the composite blade body, it is possible to suppress the electrical erosion of the metal layer, caused by the potential difference between the metal layer and the reinforced fibers included in the composite blade body.

In these configurations, it is preferable that the metal layer includes at least one of a hard metal layer having a higher HV value than a soft metal and a super-hard metal layer having a higher HV value than the hard metal layer, the hard metal layer is a Ni alloy plating layer, and the super-hard metal layer is a hard Cr plating layer. With these configurations, it is possible to suppress wearing of the leading edge section as a result of collisions of the water droplets.

Further, it is preferable that the metal layer includes both the hard metal layer and the super-hard metal layer, and the super-hard metal layer is formed on at least a part of an outer side of the hard metal layer. With these configurations, by also forming the super-hard metal layer on at least a part of the outer side of the hard metal layer, it is possible to improve the followability of the metal layer to the curvature of the composite blade body in the blade length direction, and also to prioritize the reinforcement of the part where a higher impact energy is applied due to the collisions of the water droplets at angles closer to the right angle.

In the configuration in which the metal layer includes at least one of the hard metal layer and the super-hard metal layer, it is preferable that the metal layer further includes a soft metal layer including the soft metal on a side on which the composite blade body is provided. It is also preferable that the soft metal layer is a Cu plating layer or a pure Ni plating layer. With these configurations, because the soft metal layer is soft and highly ductile, the shearing stress resulting from the differences in the linear expansion coefficient, the elastic modulus, and the like between the composite blade body and the hard metal layer or the super-hard metal layer can be reduced. Therefore, the adhesiveness of the hard metal layer or the super-hard metal layer can be improved, so that it is possible to reduce the likeliness for the hard metal layer or the super-hard metal layer to come off. Furthermore, because the soft metal layer is soft and highly ductile, although the hard metal layer or the super-hard metal layer is a vulnerable material shaped to follow the shape of the leading edge section of the composite blade body, it is possible to reduce the likeliness for the hard metal layer or the super-hard metal layer to crack.

In these configurations, it is preferable that an outer surface of the metal layer and an outer surface of an interface portion between the composite blade body and the metal layer each have a continuous surface. With such a configuration, it is possible to suppress a reduction in the efficiency of the aerodynamic surface of the composite blade.

To solve the above problems and achieve the object, a metallic leading-edge cover forming unit includes a female mold having a shape that is fittable to a leading edge section including a leading edge that is a part of a composite blade body on an upstream side of an air stream, with a predetermined gap; and a metal layer formed on an inner surface of the female mold and having a volume corresponding to the predetermined gap. With such a configuration, the metal layer can be handled, e.g., transported, while maintaining the shape of the metal layer with the female mold.

To solve the above problems and achieve the object, a method for manufacturing a composite blade is a method for manufacturing a composite blade by providing a metal layer to an outer side of a leading edge section including a leading edge that is a part of a composite blade body on an upstream side of an air stream. The method includes forming, on an inner surface of a female mold having a shape that is fittable to the leading edge section of the composite blade body with a predetermined gap, the metal layer having a volume corresponding to the predetermined gap; and fitting and bonding the metal layer formed in the female mold to the leading edge section of the composite blade body. With such a configuration, the metal layer that has a high corrosion resistance and fatigue strength, that is light-weighted, and that has a shape following the leading edge section of the composite blade body is bonded to the leading edge section of the composite blade body via the adhesive layer. Therefore, it is possible to acquire a composite blade provided with a countermeasure for water droplet erosion suitable for a composite blade body that is used in an industrial gas turbine compressor.

In this configuration, it is preferable that the female mold includes a first female mold and a second female mold that are separatable from and combinable with each other, the first female mold being fittable to the leading edge section of the composite blade body so as to face a tip-end side section of the leading edge section, the second female mold being fittable to the leading edge section of the composite blade body so as to face a base-end side section of the leading edge section, and forming the metal layer includes forming a super-hard metal layer belonging to the metal layer on an inner surface of the first female mold; combining the second female mold with the first female mold in which the super-hard metal layer; forming a hard metal layer belonging to the metal layer on an inner surface of the super-hard metal layer of the first female mold combined and on an inner surface of the second female mold combined; and forming a soft metal layer belonging to the metal layer on an inner surface of the hard metal layer. With such a configuration, the formation of the metal layer can be carried out in stages, e.g., a stage for forming the super-hard metal layer, a stage for forming the hard metal layer, and a stage for forming the soft metal layer. Therefore, different types of metal layer can be formed on desirable sections of the leading edge section of the composite blade body.

DESCRIPTION OF EMBODIMENTS

An embodiment according to the present invention will be explained in detail with reference to some drawings. The embodiment is, however, not intended to limit the scope of the present invention in any way. Furthermore, the elements described in the embodiment include those that can be easily replaced by those skilled in the art, or those that are substantially the same. Furthermore, the elements described below may be combined as appropriate.

Embodiment

Figure 1:
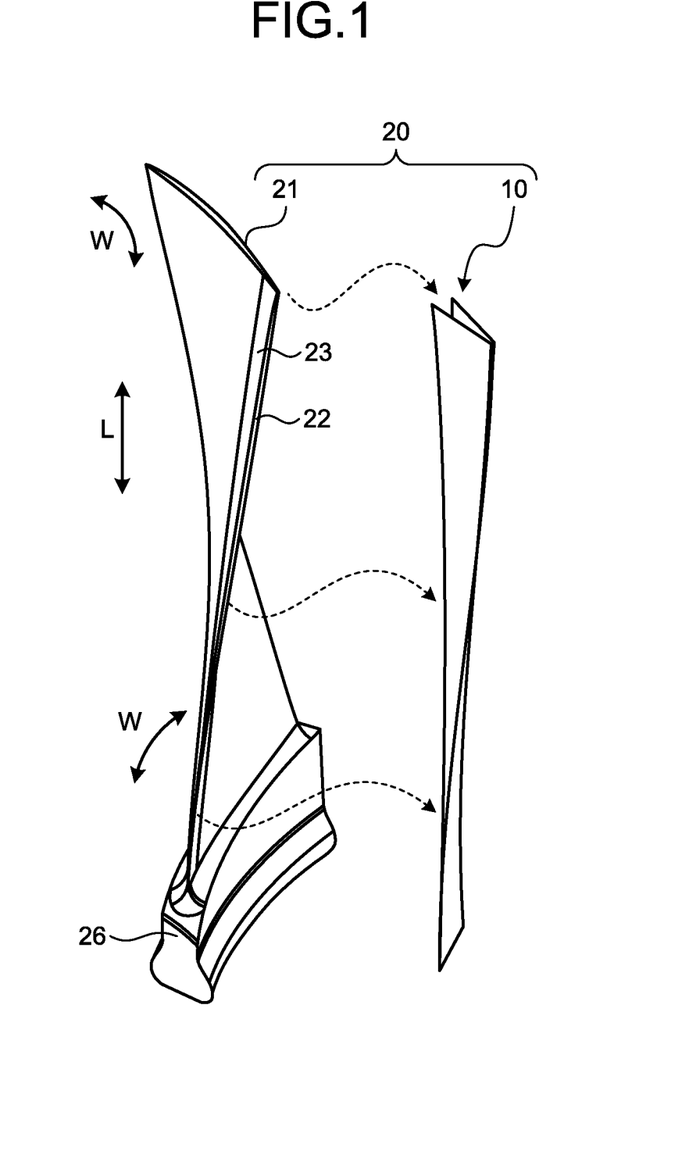
FIG. 1 is a schematic perspective view of a composite blade according to an embodiment.

FIG. 1 is a schematic perspective view of a composite blade 20 according to the embodiment. The composite blade 20 includes, as illustrated in FIG. 1, a metal layer 10, and a composite blade body 21 where the metal layer 10 is provided to the outer side of a leading edge section 23 including a leading edge 22. The leading edge section 23 corresponds to a section extending across the leading edge 22 in the direction intersecting with the leading edge 22 by a certain distance from the leading edge 22, and covering a part of a suction-side surface and a part of a pressure-side surface that are adjacent to the leading edge 22, by a distance corresponding to at least a part of the entire length or to the entire length of the leading edge 22 in the direction extending along the leading edge 22. The composite blade 20 explained herein is an example of a composite blade used in an industrial gas turbine compressor.

The composite blade body 21 is formed by laminating a composite material in layers, in the blade thickness direction that is a direction connecting the suction side and the pressure side of the composite blade body 21, for example. An L direction illustrated in FIG. 1 is an blade length direction that is a direction connecting an blade top side and an blade root side of the composite blade body 21. A W direction illustrated in FIG. 1 is an blade width-direction that is a direction connecting the leading-edge side and the trailing-edge side of the composite blade body 21. The suction side and the pressure side of the composite blade body 21 are complicated curved surfaces, and the W direction extending along the blade top side and the W direction extending along the blade root side are in a twisted relation. Among the two curved lines where the suction-side curved surface intersects with the pressure-side curved surface of the composite blade body 21, the curved line on the upstream side of the air stream serves as the leading edge 22, and the curved line is on the downstream side of the air stream serves as the trailing edge. With a composite blade support member 26 fixing the root-side end of the blade to the circumferential surface of a rotational axis, the composite blade body 21 is supported rotatably across a predetermined diameter and in a predetermined direction.

The composite material included in the composite blade body 21 includes reinforced fibers and resin with which the reinforced fibers is impregnated. Explained herein as a composite material is a material generally used in aircrafts, automobiles, and ships, for example. Also explained herein as the reinforced fibers are a bundle of several hundred to several thousand basic fibers having a size equal to or larger than 5 micrometers and equal to or smaller than 7 micrometers. Preferable examples of the basic fibers with which the reinforced fibers is fabricated include glass fibers, carbon fibers, and aramid fibers. The basic fibers with which the reinforced fibers are fabricated is not limited to these examples, and may also be any other plastic fibers or metal fibers.

The resin with which the reinforced fibers is impregnated is preferably a thermo-setting resin, but may also be a thermo-plastic resin. Examples of the thermo-setting resins include epoxy resin, polyester resin, and vinyl ester resin. Examples of thermo-plastic resins include polyamide resin, polypropylene resin, acrylonitrile butadiene styrene (ABS) resin, polyether ether ketone resin (PEEK), polyetherketoneketone (PEKK), and polyphenylene sulfide (PPS). The resin with which the reinforced fibers is impregnated is not limited thereto, and may be any other resin.

When the resin with which the reinforced fibers is impregnated is a thermo-setting resin, the thermo-setting resin can take a softened state, a hardened state, and a semi-hardened state. The softened state is a state before the thermo-setting resin becomes thermally set. The softened state is a state in which the thermo-setting resin is not self-supporting, and in which the resin is not capable of maintaining its shape without the support of a supporting body. The softened state is a state in which the thermo-setting resin is heated and allowed to go through a thermo-setting reaction. The hardened state is a state after the thermo-setting resin has become thermally set. The hardened state is a state in which the thermo-setting resin is self-supporting, and is capable of maintaining its shape without any support of a supporting body. The hardened state is a state in which the thermo-setting resin cannot go through a thermo-setting reaction even by being heated. The semi-hardened state is a state between the softened state and the hardened state. The semi-hardened state is a state in which the thermo-setting resin has been thermally set by a degree less than that resulting in the hardened state. The semi-hardened state is a state in which the thermo-setting resin is self-supporting, and is capable of maintaining its shape without any support of a supporting body. The semi-hardened state is a state in which the thermo-setting resin can go through a thermo-setting reaction by being heated. In the explanation below, an intermediate base material for a composite material, resultant of impregnating reinforced fibers, such as carbon fibers, with a thermo-setting resin having not been hardened yet will be referred to as "prepreg", as appropriate.

The metal layer 10 is provided in a manner bonded to the outer surface of the leading edge section 23, and covering the leading edge section 23, as illustrated in FIG. 1. The metal layer 10 has a film thickness equal to or larger than 5 micrometers and equal to or smaller than 100 micrometers, and preferably has a film thickness equal to or larger than 5 micrometers and equal to or smaller than 50 micrometers. Other details of the metallic material used for the metal layer 10 will be described later in detail, in the section for explaining some examples of a detailed structure of the composite blade 20 described below.

Figure 2:
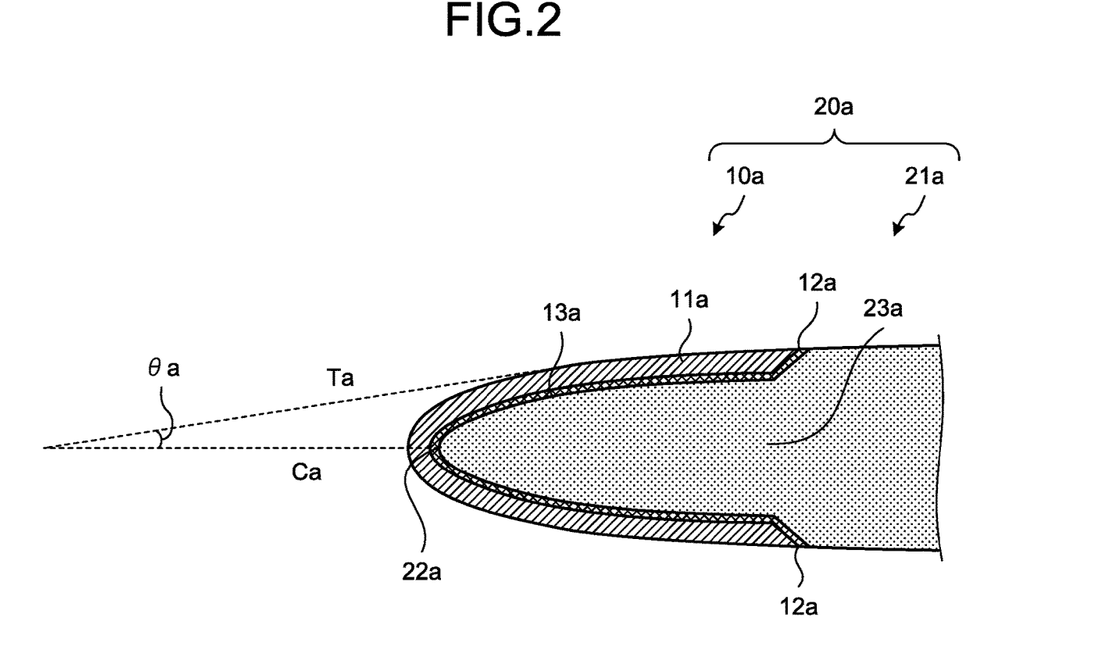
FIG. 2 is a sectional view illustrating an exemplary detailed structure of the composite blade according to the embodiment.
Figure 3:
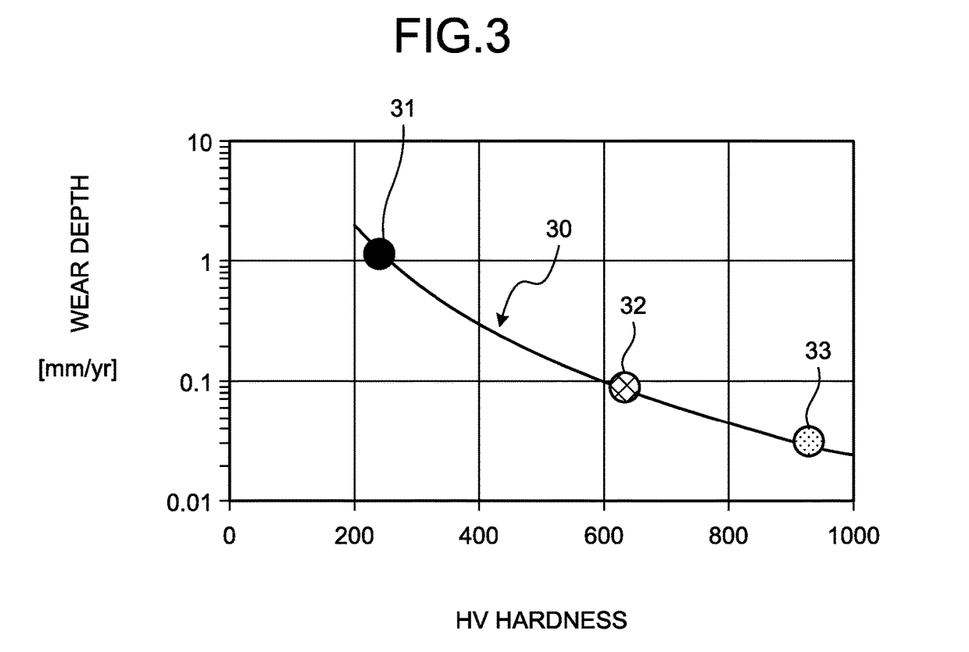
FIG. 3 is a graph illustrating the characteristics of the metal layer illustrated in FIG. 2.
Figure 4:
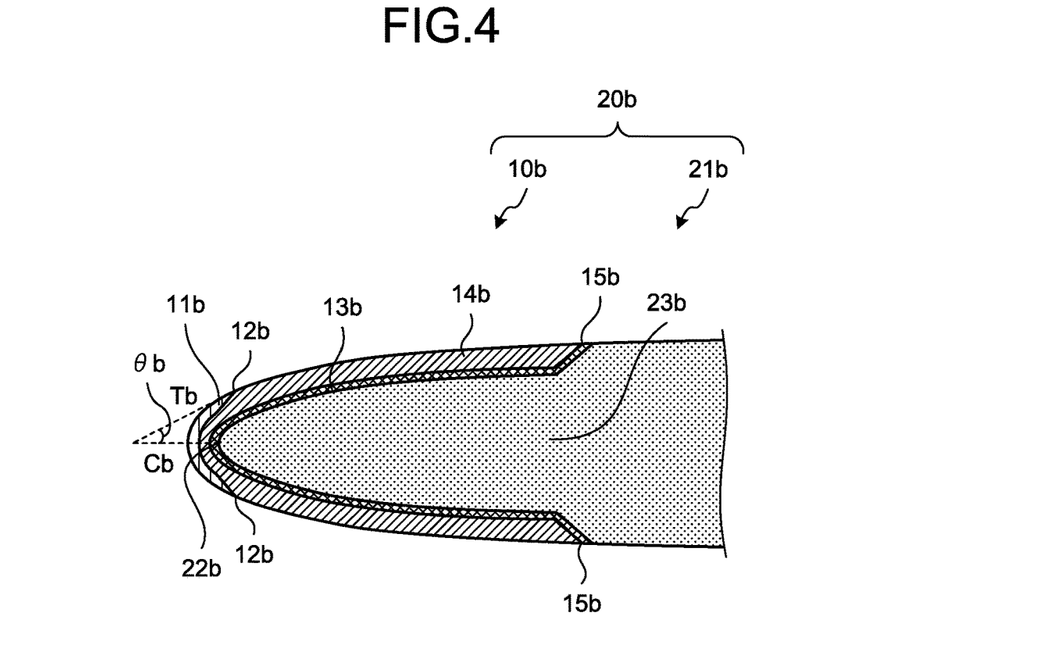
FIG. 4 is a sectional view illustrating another exemplary detailed structure of the composite blade according to the embodiment.
Figure 5:
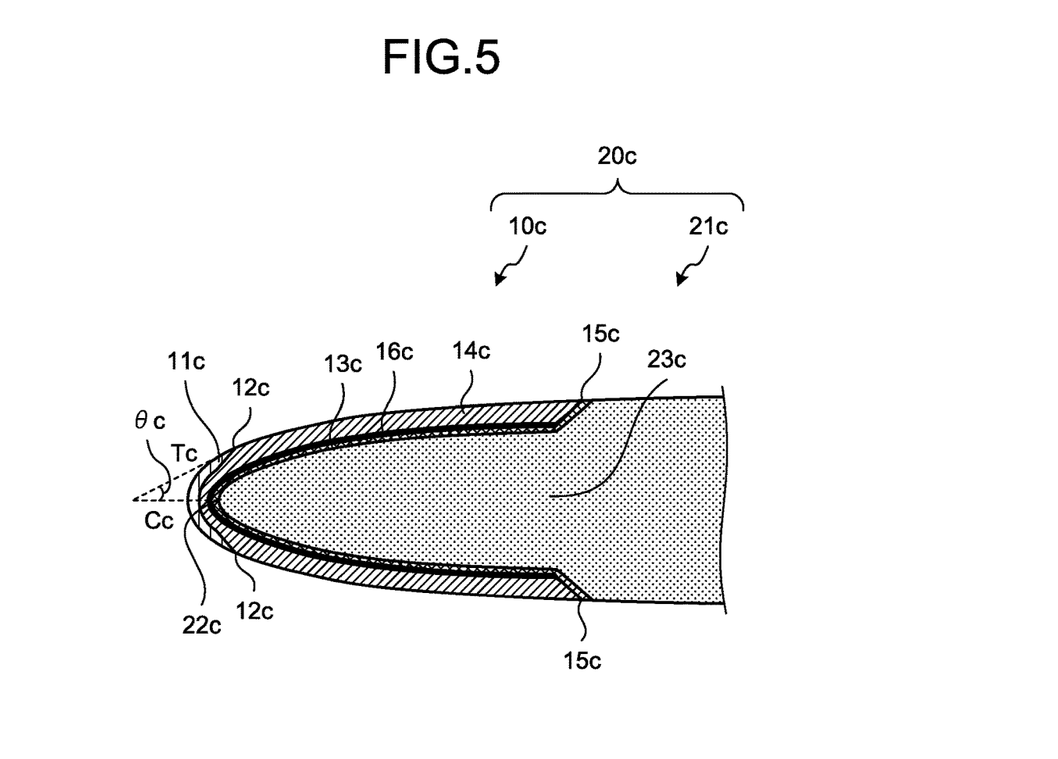
FIG. 5 is a sectional view illustrating still another exemplary detailed structure of the composite blade according to the embodiment.

FIG. 2 is a sectional view illustrating an exemplary detailed structure of the composite blade 20 according to the embodiment. FIG. 3 is a graph illustrating the characteristics of the metal layer 10 illustrated in FIG. 2. FIG. 4 is a sectional view illustrating another exemplary detailed structure of the composite blade 20 according to the embodiment. FIG. 5 is a sectional view illustrating still another exemplary detailed structure of the composite blade 20 according to the embodiment. FIGS. 2, 4, and 5 are all sectional views across a plane extending a direction perpendicular to the curved line of the leading edge 22. Some exemplary detailed structure of the composite blade 20 will now be explained with reference to FIGS. 2, 3, 4, and 5.

A composite blade 20a that is a first exemplary detailed structure of the composite blade 20 includes, as illustrated in FIG. 2, a metal layer 10a that is a first exemplary detailed structure of the metal layer 10, and a composite blade body 21a that is a first exemplary detailed structure of the composite blade body 21. In the composite blade body 21a, the metal layer 10a is provided on the outer side of a leading edge section 23a including a leading edge 22a. The leading edge 22a and the leading edge section 23a are first examples of the detailed structures of the leading edge 22 and the leading edge section 23, respectively.

The composite blade 20a also includes, as illustrated in FIG. 2, an adhesive layer 13a that is provided between the metal layer 10a and the leading edge section 23a, and with which the metal layer 10a is bonded to the leading edge section 23a. For the adhesive layer 13a, either a cold-setting adhesive or a heat-setting adhesive may be used. When the resin of the metal layer 10a to be bonded to the leading edge section 23a is at a semi-hardened state, a heat-setting adhesive is preferably used. In this embodiment, the composite blade 20a is provided with the adhesive layer 13a, but the present invention is not limited to this configuration. Another possible configuration is, for example, a configuration in which the boundary between the adhesive layer 13a and the leading edge section 23a is unclear because the metal layer 10a is bonded to the leading edge section 23a with the resin included in the leading edge section 23a. Still another possible configuration is, for example, a configuration in which the boundary between the adhesive layer 13a and the leading edge section 23a is unclear because the metal layer 10a is bonded to the leading edge section 23a with an adhesive having the same constituent as that of the resin included in the leading edge section 23a. Because this adhesive layer 13a has an electric insulating property, the electrical erosion of the metal layer 10a can be suppressed.

Furthermore, it is preferable for the leading edge section 23a of the composite blade body 21a to be provided with an electric insulating layer having an electric insulating property, in a manner in contact with a surface on the side on which the metal layer 10a is provided. Furthermore, it is more preferable for the electric insulating layer to be an insulating glass fiber layer. With such a composite blade 20a, because the electric insulating layer electrically insulates the metal layer 10a from the leading edge section 23a of the composite blade body 21a, it is possible to suppress the electrical erosion of the metal layer 10a, caused by the potential difference between the metal layer 10a and the reinforced fibers included in the composite blade body 21a.

The metal layer 10a is made of a metal having a high corrosion resistance and fatigue strength. The metal layer 10a has characteristics represented by the Vickers hardness (HV) and the wear depth plotted as a curved line 30 in the graph in FIG. 3. In other words, the metal layer 10a has a tendency that, as the HV value becomes higher, the wear depth becomes smaller. In the graph illustrated in FIG. 3, the horizontal axis represents the HV value, and the vertical axis represents the wear depth. The wear depth is scaled in units of [mm/yr]. The unit [mm/yr] of the wear depth represents a wear depth [mm] per year.

When a soft metal is used for the metal layer 10a, the metal layer 10a exhibits characteristics near the point 31 and on the left side of the point 31 of the curved line 30, as indicated in the graph in FIG. 3. In other words, the metal layer 10a exhibits an HV value equal to or more than 30 and equal to or less than 300, and a wear depth equal to or more than 1 mm/yr and equal to or less than 10 mm/yr. Examples of the soft metal used for the metal layer 10a include a layer of copper (Cu) plating, formed as a layer by copper (Cu) plating, and a relatively less hard layer of pure-nickel (Ni) plating, formed as a layer by highly pure nickel (Ni) plating. When a hard metal is used for the metal layer 10a, the metal layer 10a exhibits characteristics near the point 32 on the curved line 30. In other words, the metal layer 10a exhibits a higher HV value compared with the soft metal, that is, an HV value equal to or more than 500 and equal to or less than 800, and exhibits a wear depth equal to or more than 0.04 mm/yr and equal to or less than 0.2 mm/yr. An example of the hard metal used in the metal layer 10a includes a layer of nickel (Ni) alloy plating, formed as a layer by nickel (Ni) alloy plating. Preferably used as the nickel alloy plating are nickel (Ni)-phosphorus (P) plating, nickel (Ni)-boron (B) plating, or nickel (Ni)-tungsten (W) plating, for example. With the nickel alloy plating, electroless plating can be used. Therefore, by using the electroless plating, a layer can be formed at an even film thickness even on a surface with a small opening and having a shape with some depth. When a super-hard metal is used for the metal layer 10a, the metal layer 10a exhibits characteristics near the point 33 on the curved line 30. In other words, the metal layer 10a exhibits a higher HV value compared with the hard metal, that is, an HV value equal to or more than 800 and equal to or less than 1200, and exhibits a wear depth equal to or more than 0.01 mm/yr and equal to or less than 0.04 mm/yr. An example of the super-hard metal used for the metal layer 10a includes a layer of hard chrome (Cr) plating, formed as a layer by hard chrome (Cr) plating.

The metal layer 10a includes, as illustrated in FIG. 2, a super-hard metal layer 11a. In other words, a super-hard metal is used in the metal layer 10a. The present invention is not limited thereto, but it is preferable for the metal layer 10a to include at least one of a hard metal and a super-hard metal. With the use of at least one of a hard metal and a super-hard metal, the resultant wear depth of the metal layer 10a provided to the leading edge section 23a can be kept small, e.g., equal to or less than 0.2 mm/yr, so that, when the composite blade 20a is used in an industrial gas turbine compressor, wearing of the leading edge section 23a can be suppressed, even if the water droplets are sprayed toward the composite blade body 21a to cool the suctioned air, and the water droplets collide with the leading edge section 23a.

The super-hard metal layer 11a in the metal layer 10a is provided in a manner extending across the leading edge 22a, in a direction intersecting with the leading edge 22a, as illustrated in FIG. 2. Specifically, in a cross section across a direction perpendicularly intersecting with the curved line of the leading edge 22a, the super-hard metal layer 11a is provided in such a manner that the direction of a tangent line Ta on an end 12a of the super-hard metal layer 11a forms an angle θa equal to or greater than 0 degrees and equal to or less than 15 degrees with respect to a direction Ca that the leading edge 22a faces, where the end 12a is an end of the super-hard metal layer 11a in the direction intersecting with the leading edge 22a. The super-hard metal layer 11a is also provided by a length equal to at least a part of the entire length of, or to the entire length of the leading edge 22a, in the direction extending along the leading edge 22a.

It is also preferable for an interface between the super-hard metal layer 11a and the leading edge section 23a of the composite blade body 21a to be formed smoothly with no unevenness, from the side of the direction Ca to the side of the ends 12a. It is more preferable for the thickness of the super-hard metal layer 11a to be the greatest on the side of the direction Ca, to become smaller toward the ends 12a, and to become just zero in the area having the ends 12a. In such a case, with the composite blade 20a, because the shearing stress resulting from the differences in the linear expansion coefficient, the elastic modulus, and the like between the composite blade body 21a and the super-hard metal layer 11a is reduced, it is possible to improve the adhesiveness of the super-hard metal layer 11a, so that the likeliness for the super-hard metal layer 11a to come off can be reduced. Furthermore, with the composite blade 20a, although the super-hard metal layer 11a is a vulnerable material shaped to follow the shape of the leading edge section 23a of the composite blade body 21a, it is possible to reduce the likeliness for the super-hard metal layer 11a to crack.

It is also preferable for the interface between the super-hard metal layer 11a and the leading edge section 23a of the composite blade body 21a to have an arithmetic mean roughness equal to or larger than 1 micrometer and equal to or smaller than 10 micrometers. Specifically, it is preferable for the interface between the super-hard metal layer 11a and the leading edge section 23a to be processed, e.g., to be applied with blasting such as sanding, to an arithmetic mean roughness within the range mentioned above. With such a processing of the composite blade 20a, the anchor effect arises on the interface between the super-hard metal layer 11a and the leading edge section 23a due to this arithmetic mean roughness of the interface, so that the bonding strength between the super-hard metal layer 11a and the leading edge section 23a can be improved.

It is also preferable for the outer surface of an interface portion between the super-hard metal layer 11a and the leading edge section 23a of the composite blade body 21a, that is, the outer surface near the ends 12a to be a continuous surface. The "continuous surface" herein means a smooth surface without any unevenness and irregularities. With a continuous surface, it is possible to suppress a reduction in the efficiency of the aerodynamic surface of the composite blade 20a.

In the composite blade 20a having a structure described above, because the metal layer 10a that has a high corrosion resistance and fatigue strength, that is light-weighted, and that has a shape following the leading edge section 23a of the composite blade body 21a is bonded to the leading edge section 23a of the composite blade body 21a via the adhesive layer 13a, the composite blade body 21a is suitable for an application as the countermeasure for the water droplet erosion in an industrial gas turbine compressor.

A composite blade 20b is a second exemplary detailed structure of the composite blade 20, and is equivalent to the composite blade 20a in which the metal layer 10a is replaced with a metal layer 10b, as illustrated in FIG. 4. Because the other elements of the composite blade 20b are the same as those of the composite blade 20a, detailed explanations thereof will be omitted.

In the explanation of the composite blade 20b that is the second exemplary detailed structure of the composite blade 20, for the convenience of explanation, in the specification and the drawings, elements are assigned with different reference numerals from those used in the explanation of the composite blade 20a that is the first exemplary detailed structure of the composite blade 20. Specifically, the elements corresponding to the metal layer 10a, the super-hard metal layer 11a, the ends 12a, the adhesive layer 13a, the composite blade body 21a, the leading edge 22a, the leading edge section 23a, the direction Ca, the tangent line Ta, and the angle θa in the composite blade 20a are referred to as a metal layer 10b, a super-hard metal layer 11b, ends 12b, an adhesive layer 13b, a composite blade body 21b, a leading edge 22b, a leading edge section 23b, a direction Cb, a tangent line Tb, and an angle θb, respectively, in the composite blade 20b.

In the composite blade 20b, the metal layer 10b includes, as illustrated in FIG. 4, the super-hard metal layer 11b and a hard metal layer 14b, and the super-hard metal layer 11b is provided to at least a part of the outer side of the hard metal layer 14b. Specifically, in a cross section across a direction perpendicularly intersecting with the curved line of the leading edge 22b, the hard metal layer 14b is provided in such a manner that the direction of the tangent line on an end 15b of the hard metal layer 14b forms an angle equal to or greater than 0 degrees and equal to or less than 15 degrees with respect to a direction Cb that the leading edge 22b faces, where the end 15b is an end of the hard metal layer 14b in the direction intersecting with the leading edge 22b. The hard metal layer 14b is also provided by a length equal to at least a part of the entire length of, or to the entire length of the leading edge 22b, in the direction extending along the leading edge 22b. Specifically, in a cross section across a direction perpendicularly intersecting with the curved line of the leading edge 22b, the super-hard metal layer 11b is provided in such a manner that the direction of the tangent line Tb on an end 12b forms an angle θb equal to or greater than 15 degrees and equal to or less than 60 degrees with respect to the direction Cb that the leading edge 22b faces. The super-hard metal layer 11b is provided by a length equal to or shorter than the length of the hard metal layer 14b, in the direction following the leading edge 22b. Therefore, in the composite blade 20b, by providing the super-hard metal layer 11b to at least a part of the outer side of the hard metal layer 14b, it is possible to improve the followability of the metal layer 10b to the curvature of the composite blade body 21b in the blade length direction, and to prioritize the reinforcement of a part where a higher impact energy is applied due to the collisions of the water droplets at angles closer to the right angle. In the explanation below, within the leading edge section 23b of the composite blade body 21b, the section provided with the super-hard metal layer 11b will be referred to as a tip-end side section, and the section provided with the hard metal layer 14b but not provided with the super-hard metal layer 11b will be referred to as a base-end side section.

It is also preferable for the interface between the super-hard metal layer 11b and the hard metal layer 14b to be formed smoothly with no unevenness from the side of the direction Cb to the side of the ends 12b. Furthermore, it is more preferable for the thickness of the super-hard metal layer 11b to be the greatest on the side of the direction Cb, to become smaller toward the ends 12b, and to become just zero in the area having the ends 12b. It is also preferable for the interface between the hard metal layer 14b and the leading edge section 23b of the composite blade body 21b to be formed smoothly with no unevenness from the side of the direction Cb to the side of the ends 12b. Furthermore, it is more preferable for the thickness of the hard metal layer 14b to be the greatest in the section at the ends 12b, and to become gradually smaller toward the ends 15b, and to become just zero in the area having the ends 15b, within the section between the ends 12b and the ends 15b. In such a case, the composite blade 20b exhibits the same effects as those achieved by the configuration in which the interface between the super-hard metal layer 11a and the leading edge section 23a of the composite blade body 21a is formed smoothly without unevenness in the composite blade 20a, and in which the thickness of the super-hard metal layer 11a becomes gradually smaller toward the ends 12a.

Furthermore, it is preferable for the outer surface of the interface portion between the super-hard metal layer 11b and the hard metal layer 14b, that is, the outer surface near the ends 12b to be a continuous surface, and for the outer surface of the interface portion between the hard metal layer 14b and the leading edge section 23b of the composite blade body 21b, that is, the outer surface near the ends 15b to be a continuous surface. With such a continuous surface, it is possible to suppress a reduction in the efficiency of the aerodynamic surface of the composite blade 20b.

Because the composite blade 20b has a structure described above, the composite blade 20b achieves the same advantageous effects as those achieved by the composite blade 20a, in addition to those described above.

A composite blade 20c is a third exemplary detailed structure of the composite blade 20, and is equivalent to the composite blade 20b in which a soft metal layer 16c including a soft metal is additionally formed on the interface with the hard metal layer 14b, on the side facing the composite blade body 21b, as illustrated in FIG. 5. Because the other elements of the composite blade 20c are the same as those of the composite blade 20b, detailed explanations thereof will be omitted.

In the explanation of the composite blade 20c that is a third exemplary detailed structure of the composite blade 20, for the convenience of explanation, in the specification and the drawings, elements are assigned with different reference numerals from those used in the explanation of the composite blade 20b that is the second exemplary detailed structure of the composite blade 20. Specifically, the elements corresponding to the metal layer 10b, the super-hard metal layer 11b, the ends 12b, the adhesive layer 13b, the hard metal layer 14b, the ends 15b, the composite blade body 21b, the leading edge 22b, the leading edge section 23b, the direction Cb, the tangent line Tb, and the angle θb in the composite blade 20b are referred to as a metal layer 10c, a super-hard metal layer 11c, ends 12c, an adhesive layer 13c, a hard metal layer 14c, ends 15c, a composite blade body 21c, a leading edge 22c, a leading edge section 23c, a direction Cc, a tangent line Tc, and an angle θc, respectively, in the composite blade 20c.

The soft metal layer 16c of the composite blade 20c is provided to a surface of the metal layer 10c, on the side on which the composite blade body 21c is provided, as illustrated in FIG. 5. The soft metal layer 16c is formed on the entire surface of the interface portion between the hard metal layer 14c and the leading edge section 23c of the composite blade body 21c. Therefore, because the soft metal layer 16c is soft and highly ductile, the composite blade 20c can reduce the shearing stress resulting from the differences in the linear expansion coefficient, the elastic modulus, and the like between the composite blade body 21c and the hard metal layer 14c or the super-hard metal layer 11c. With the shearing stress reduced, it is possible to improve the adhesiveness of the hard metal layer 14c or the super-hard metal layer 11c, so that the likeliness for the hard metal layer 14c or the super-hard metal layer 11c to come off can be reduced. Furthermore, because the soft metal layer 16c is soft and highly ductile, the composite blade 20c can reduce the likeliness for the hard metal layer 14c or the super-hard metal layer 11c to crack, although the hard metal layer 14c or the super-hard metal layer 11c is a vulnerable material shaped to follow the leading edge section 23c of the composite blade body 21c.

Because the composite blade 20c has a structure described above, the composite blade 20c achieves the same advantageous effects as those achieved by the composite blade 20b, in addition to those described above.

Figure 6:
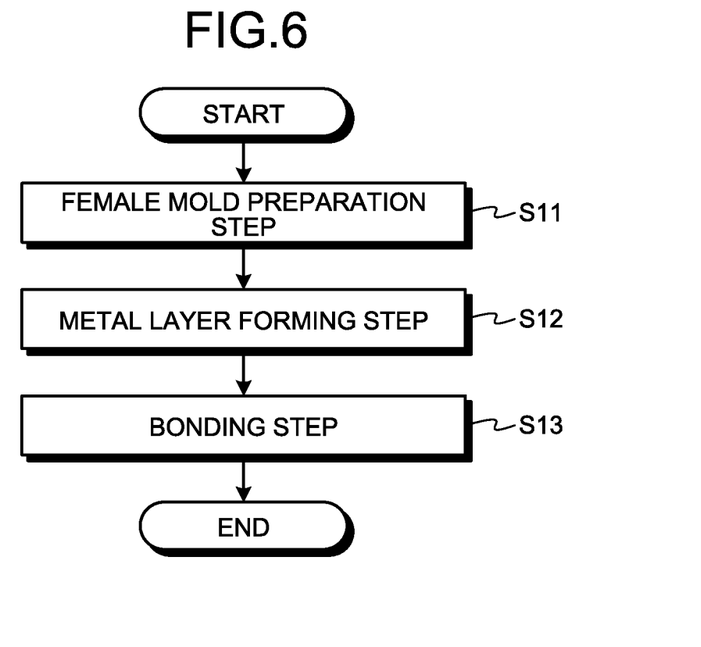
FIG. 6 is a flowchart illustrating a method for manufacturing a composite blade according to the embodiment.
Figure 7:
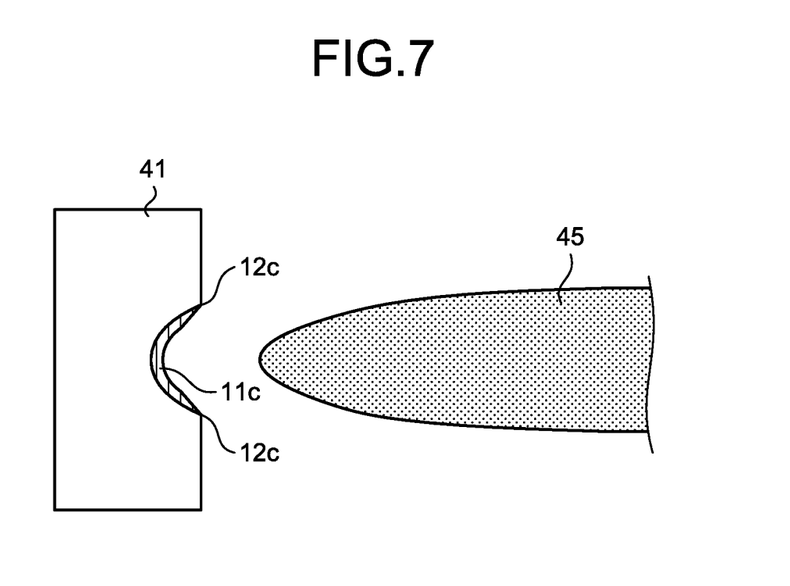
FIG. 7 is an explanatory schematic for explaining one stage of a metal layer forming step illustrated in FIG. 6.
Figure 8:
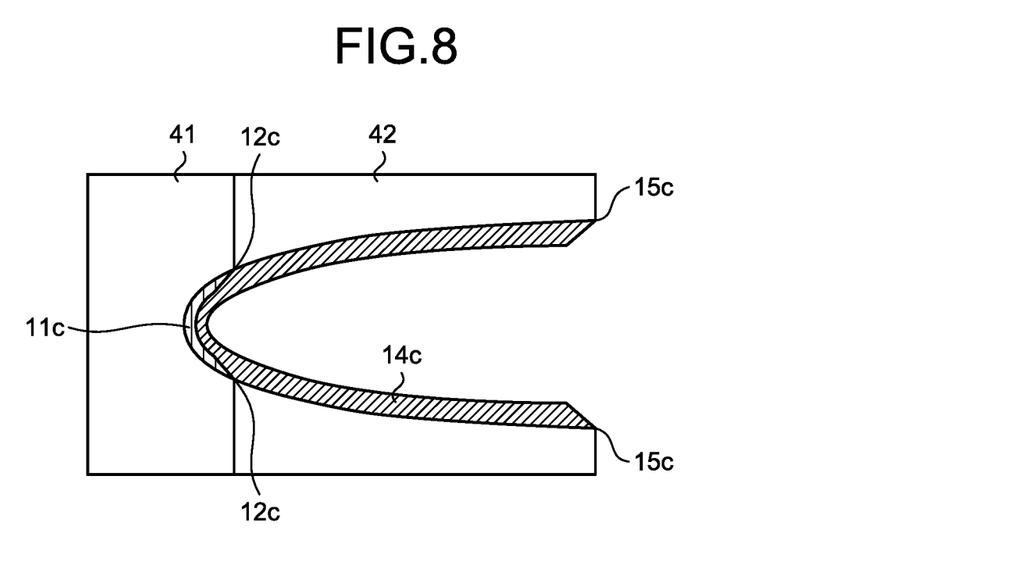
FIG. 8 is an explanatory schematic for explaining a subsequent stage of the metal layer forming step illustrated in FIG. 6.
Figure 9:
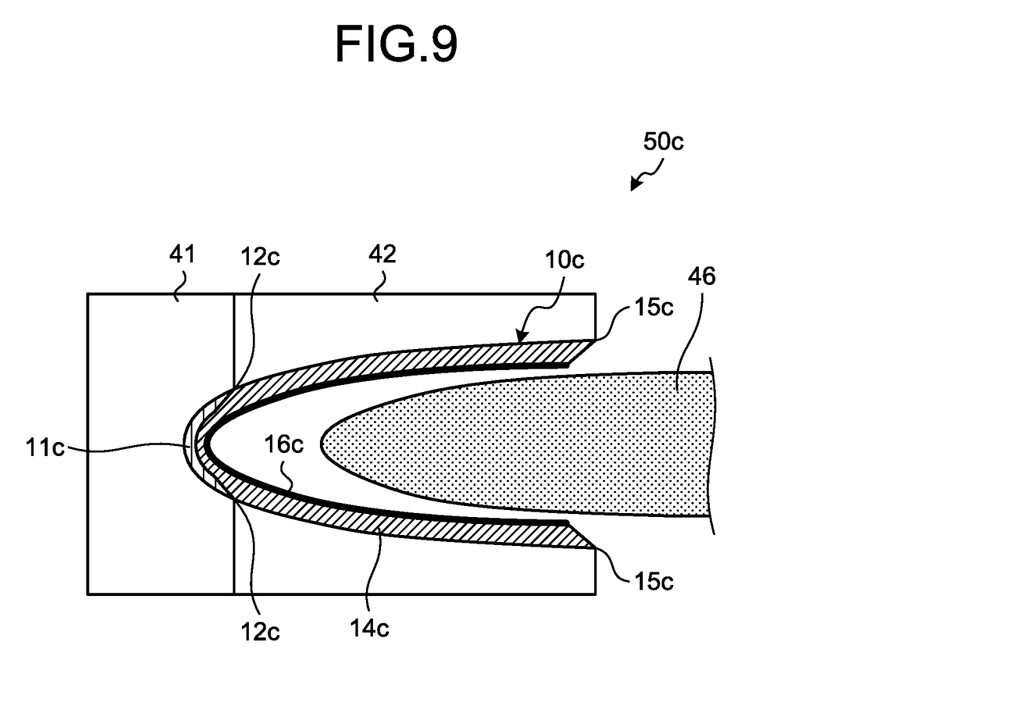
FIG. 9 is an explanatory schematic for explaining a further subsequent stage of the metal layer forming step illustrated in FIG. 6.
Figure 10:
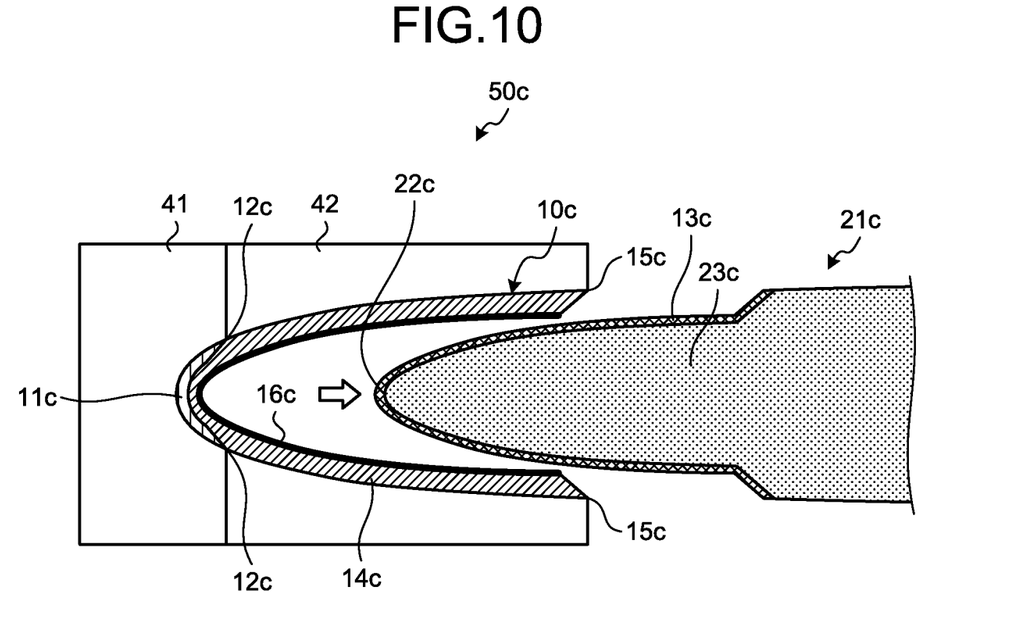
FIG. 10 is an explanatory schematic for explaining one stage of a bonding step illustrated in FIG. 6.
Figure 11:
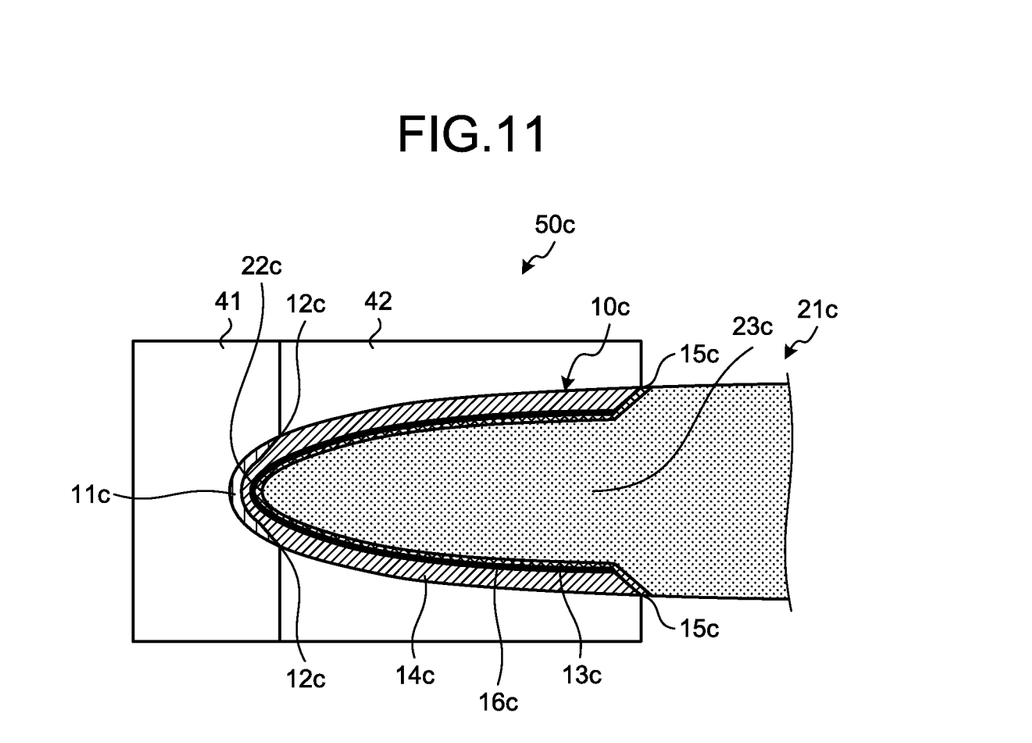
FIG. 11 is an explanatory schematic for explaining a subsequent stage of the bonding step illustrated in FIG. 6.
Figure 12:
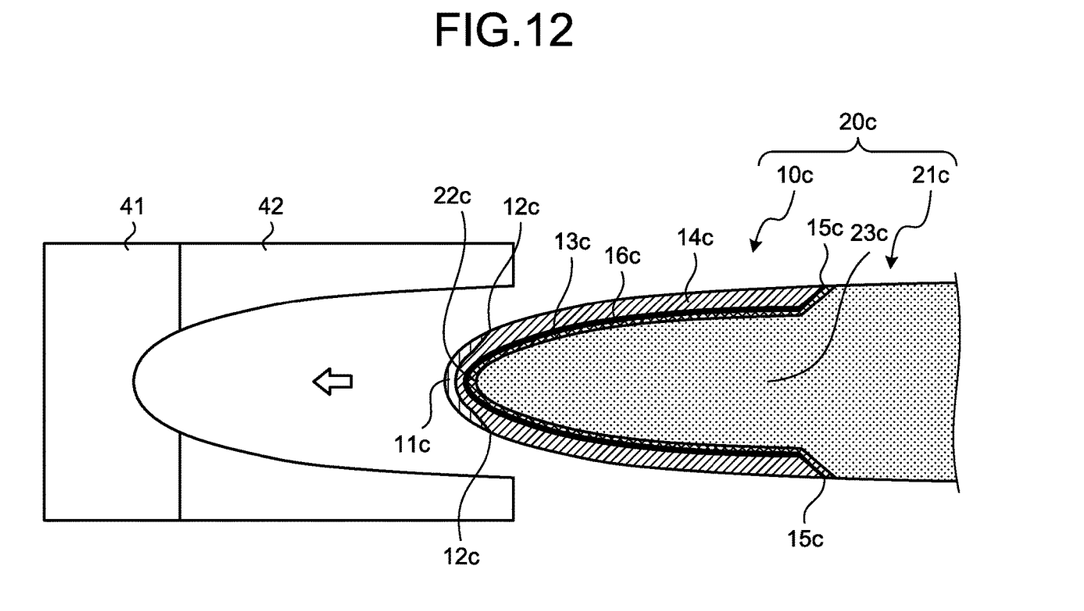
FIG. 12 is an explanatory schematic for explaining a further subsequent stage of the bonding step illustrated in FIG. 6.

FIG. 6 is a flowchart illustrating a method for manufacturing a composite blade according to the embodiment. FIG. 7 is an explanatory schematic for explaining one stage of a metal layer forming step S12 illustrated in FIG. 6. FIG. 8 is an explanatory schematic for explaining a subsequent stage of the metal layer forming step S12 illustrated in FIG. 6. FIG. 9 is an explanatory schematic for explaining a further subsequent stage of the metal layer forming step S12 illustrated in FIG. 6. FIG. 10 is an explanatory schematic for explaining one stage of the bonding step S13 illustrated in FIG. 6. FIG. 11 is an explanatory schematic for explaining a subsequent stage of the bonding step S13 illustrated in FIG. 6. FIG. 12 is an explanatory schematic for explaining a still subsequent stage of the bonding step S13 illustrated in FIG. 6. A method for manufacturing the composite blade 20c, which has the most complicated structure among the three examples described above, will now be explained with reference to FIGS. 6 to 12, as an exemplary method for manufacturing the composite blade 20 according to the embodiment. The method for manufacturing the composite blade 20 according to the embodiment includes, as illustrated in FIG. 6, a female mold preparation step S11, a metal layer forming step S12, and a bonding step S13.

The female mold preparation step S11 is a step for preparing a female mold having a shape that can be fitted to the leading edge section 23c of the composite blade body 21c, with a predetermined gap therebetween. The predetermined gap is a space having a shape and a volume that are equivalent to those of the metal layer 10c that is to be formed at the metal layer forming step S12 described later. The female mold can be prepared by forming a material of the female mold using the blueprint of the leading edge section 23c of the composite blade body 21c and that of the metal layer 10c. It is also possible to prepare the female mold by forming the material of the female mold using models of the leading edge sections 23c of the composite blade bodies 21c all of which have slightly different shapes, and a model modelling the shape of the metal layer 10c. It is also possible to form the female mold by using the leading edge section 23c cut off from the composite blade body 21c, and a model modelling the shape of the metal layer 10c.

It is preferable to form the female mold using a material enabling the metal layer 10c to be formed favorably at the metal layer forming step S12 described later, and enabling the metal layer 10c to be removed favorably at the bonding step S13 described later. Stainless steel, which is a metal having a surface on which a passive film is formed, is preferably used, as a material for forming the female mold, for example.

The female mold may be one unit, or may include two or more units that can be separated and combined. In this embodiment, the female mold includes a first female mold 41 illustrated in FIG. 7 and the drawings thereafter, and a second female mold 42 illustrated in FIG. 8 and the drawings thereafter. As illustrated in FIG. 7, the first female mold 41 has a shape that can be fitted to the leading edge section 23c of the composite blade body 21c with a gap in a size corresponding to the thickness of the super-hard metal layer 11c, the hard metal layer 14c, and the soft metal layer 16c, in a manner facing the tip-end side section where the super-hard metal layer 11c is to be formed. The second female mold 42 has a shape that can be fitted to the leading edge section 23c of the composite blade body 21c with a gap in a size corresponding to the thickness of the hard metal layer 14c and the soft metal layer 16c, in a manner facing the base-end side section that extending between the ends 12c and the end 15c, as illustrated in FIG. 8.

Furthermore, the first female mold 41 and the second female mold 42 have such shapes that, when the first female mold 41 and the second female mold 42 are combined into one unit, the inner surface of the interface portion between these two, that is, the inner surface near the part corresponding to the ends 12c forms a continuous surface. In this manner, the metal layer 10c formed at the metal layer forming step S12, which is described later, has a continuous outer surface across the interface portion between the super-hard metal layer 11c and the hard metal layer 14c, that is, the outer surface near the ends 12c.

The metal layer forming step S12 is a step for forming the metal layer 10c having the volume corresponding to the predetermined gap, on the inner surface of the female mold. At the metal layer forming step S12, to begin with, the super-hard metal layer 11c is formed on the inner surface of the first female mold 41. At the metal layer forming step S12, for example, as illustrated in FIG. 7, a hard Cr plating layer that is to serve as the super-hard metal layer 11c is formed by soaking the first female mold 41 in an electrolytic hard Cr plating bath, and bringing an electrode 45 having a shape corresponding to the inner surface of the first female mold 41 closer to the inner surface of the first female mold 41, so that an electrolytic hard Cr plating is applied to the first female mold 41.

At the metal layer forming step S12, the second female mold 42 is then combined with the first female mold 41 having the super-hard metal layer 11c formed on the inner surface. At the metal layer forming step S12, the hard metal layer 14c is then formed on the inner surface of the super-hard metal layer 11c having been formed in the first female mold 41 and on the inner surface of the second female mold 42. At the metal layer forming step S12, for example, as illustrated in FIG. 8, a Ni alloy plating layer that is to serve as the hard metal layer 14c is formed by soaking the combined first female mold 41 and second female mold 42 into a Ni alloy plating bath, so that the combination is applied with Ni alloy plating.

At the metal layer forming step S12, the soft metal layer 16c is formed on the inner surface of the first female mold 41 and the second female mold 42 having the super-hard metal layer 11c and the hard metal layer 14c formed on the inner surface. At the metal layer forming step S12, for example, as illustrated in FIG. 9, a Cu plating layer or a pure Ni plating layer that is to serve as the soft metal layer 16c is formed by soaking the first female mold 41 and the second female mold 42 into an electrolytic Cu plating bath, and bringing an electrode 46 having a shape corresponding to the inner surface of the first female mold 41 and the second female mold 42 to the inner surface of the first female mold 41 and the second female mold 42, so that electrolytic Cu plating or pure Ni plating is applied to the first female mold 41 and the second female mold 42.

At the metal layer forming step S12, when the female mold includes two or more units, such as the first female mold 41 and the second female mold 42, that can be separated and combined, the formation of the metal layer 10c can be carried out in stages, e.g., the stage for forming the super-hard metal layer 11c, the stage for forming the hard metal layer 14c, and the stage for forming the soft metal layer 16c, in the manner described above. Therefore, at the metal layer forming step S12, different types of metal layer 10c can be formed on desirable sections, e.g., the tip-end side section and the base-end side section, of the leading edge section 23c of the composite blade body 21c.

Through the metal layer forming step S12, the metal layer 10c including the super-hard metal layer 11c, the hard metal layer 14c, and the soft metal layer 16c is formed in the manner described above. Through the female mold preparation step S11 and the metal layer forming step S12, a metallic leading-edge cover forming unit 50c including the first female mold 41, the second female mold 42, and the metal layer 10c having been formed on the inner surface of the first female mold 41 and the second female mold 42 and having a volume corresponding to the predetermined gap is acquired, as illustrated in FIG. 9. The metallic leading-edge cover forming unit 50c is used in bonding the metal layer 10c to the leading edge section 23c of the composite blade body 21c, at the bonding step S13 described later, and also enables the metal layer 10c to be handled, e.g., to be transported, while maintaining the shape of the metal layer 10c with the first female mold 41 and the second female mold 42.

At the metal layer forming step S12, the metal layer 10c is not formed directly on the leading edge section 23c of the composite blade body 21c, but on the first female mold 41 and the second female mold 42. This metal layer 10c is then bonded to the leading edge section 23c of the composite blade body 21c via the first female mold 41 and the second female mold 42, at the bonding step S13 described later. Therefore, at the metal layer forming step S12, when the metal layer 10c is to be formed by metal plating, a use of a relatively small metal plating bath in which the first female mold 41 and the second female mold 42 can be soaked will suffice, without using a large metal plating bath in which the composite blade body 21c having a larger size can be soaked, because the first female mold 41 and the second female mold 42 are smaller in size than the composite blade body 21c. Furthermore, at the metal layer forming step S12, when the female mold includes two or more units, such as the first female mold 41 and the second female mold 42, that can be separated and combined, and when a part of the female mold, e.g., only the first female mold 41, is to be applied with metal plating, use of an even smaller metal plating bath, in which only the first female mold 41 having an even smaller size can be soaked, will suffice. In this manner, because the metal layer forming step S12 enables the metal layer 10c to be formed using a relatively small facility, the cost for forming the metal layer 10c can be reduced dramatically, and the quality of the metal layer 10c can be improved. Furthermore, with the metal layer forming step S12, because a relatively small facility can be used, when the plating is applied in the facility, plating liquid can be supplied appropriately toward the inner surface of the first female mold 41 and the second female mold 42, even when the smallest opening is quite small, that is, equal to or less than 1 millimeter. When nickel alloy plating is to be used at the metal layer forming step S12, electroless plating can be used. By using the electroless plating, a layer can be formed at an even film thickness by supplying the plating liquid to a surface whose shape has a small opening and some depth. Furthermore, when the electrolytic plating is to be used at the metal layer forming step S12, it is possible to ensure an area where the electrode is to be attached, e.g., by forming the first female mold 41 and the second female mold 42 using a metal such as stainless steel, for example, in advance.

At the metal layer forming step S12, it is also possible to form the metal layer 10c using a vacuum treatment such as deposition or sputtering. In such a case as well, it is preferable to form the super-hard metal layer 11c, the hard metal layer 14c, and the soft metal layer 16c, in the order listed herein, in the same manner as when the metal layer 10c is formed by metal plating. Furthermore, even when such a technique is to be used, use of a relatively small vacuum chamber will suffice, in the same manner as when the metal layer 10c is formed using the metal plating described above. Therefore, the cost for forming the metal layer 10c can be reduced dramatically, and the quality of the metal layer 10c can be improved.

At the metal layer forming step S12, after the metal layer 10c is formed, an arithmetic mean roughness equal to or larger than 1 micrometer and equal to or smaller than 10 micrometers may be achieved by applying blasting such as sanding to the inner surface of the metal layer 10c. In this manner, an anchor effect arises on the interface where the leading edge section 23c of the composite blade body 21c is to be bonded to the metal layer 10c via the adhesive layer 13c at the bonding step S13 described later, so that the bonding strength between the metal layer 10c and the leading edge section 23c can be improved.

The bonding step S13 is a step for fitting and bonding the metal layer 10c formed in the first female mold 41 and the second female mold 42 to the leading edge section 23c of the composite blade body 21c. At the bonding step S13, to begin with, an adhesive layer 13c is formed by applying an adhesive to the leading edge section 23c of the composite blade body 21c. At the bonding step S13, the metallic leading-edge cover forming unit 50c is then fitted to the leading edge section 23c of the composite blade body 21c, with the side on which the metal layer 10c is formed facing the leading edge section 23c, as illustrated in FIG. 10.

At the bonding step S13, when a cold-setting adhesive is used for the adhesive layer 13c, the metal layer 10c is bonded to the leading edge section 23c of the composite blade body 21c via the adhesive layer 13c by waiting for the adhesive layer 13c to harden, with the metallic leading-edge cover forming unit 50c fitted to the leading edge section 23c of the composite blade body 21c, as illustrated in FIG. 11. At the bonding step S13, after the adhesive layer 13c made of the cold-setting adhesive hardens, the metal layer 10c is then removed from the first female mold 41 and the second female mold 42 by heating the first female mold 41 and the second female mold 42. At the bonding step S13, when prepreg is used for the composite blade body 21c, the resin included in the prepreg hardens as the heating takes place.

At the bonding step S13, when a heat-setting adhesive is used for the adhesive layer 13c, the metal layer 10c is bonded to the leading edge section 23c of the composite blade body 21c via the adhesive layer 13c, and the metal layer 10c is removed from the first female mold 41 and the second female mold 42, by heating the first female mold 41 and the second female mold 42 and allowing the adhesive layer 13c to harden, with the metallic leading-edge cover forming unit 50c fitted to the leading edge section 23c of the composite blade body 21c, as illustrated in FIG. 11. At the bonding step S13, when prepreg is used for the composite blade body 21c, the resin included in the prepreg hardens as the heating takes place.

At the bonding step S13, after the metal layer 10c is bonded to the leading edge section 23c of the composite blade body 21c via the adhesive layer 13c, and the metal layer 10c is removed from the first female mold 41 and the second female mold 42, the composite blade 20c is acquired by removing the first female mold 41 and the second female mold 42 from which the metal layer 10c has been removed, from the leading edge section 23c of the composite blade body 21c, as illustrated in FIG. 12.

When the composite blade 20b is to be formed instead of the composite blade 20c, the method for manufacturing a composite blade according to the embodiment may be changed in such a manner that the process for forming the soft metal layer 16c is omitted at the metal layer forming step S12.

When the composite blade 20a is to be formed instead of the composite blade 20c, the method for manufacturing a composite blade according to the embodiment may be changed in such a manner that the process for forming the metal layer 10c at the metal layer forming step S12 is replaced with a process for forming the metal layer 10a including the super-hard metal layer 11a.

In the method for manufacturing a composite blade according to the embodiment having the configuration described above, because the metal layers 10a, 10b, 10c that have a high corrosion resistance and fatigue strength, that are light-weighted, and that have a shape following the leading edge sections 23a, 23b, 23c of the composite blade bodies 21a, 21b, 21c are bonded to the leading edge sections 23a, 23b, 23c of the composite blade bodies 21a, 21b, 21c via the adhesive layers 13a, 13b, 13c, it is possible to acquire the composite blades 20a, 20b, 20c that are the composite blade bodies 21a, 21b, 21c used in an industrial gas turbine compressor and applied with appropriate countermeasure for water droplet erosion.

REFERENCE SIGNS LIST 10, 10a, 10b, 10c Metal layer
11a, 11b, 11c Super-hard metal layer
12a, 12b, 12c, 15b, 15c End
13a, 13b, 13c Adhesive layer
14b, 14c Hard metal layer
16c Soft metal layer
20, 20a, 20b, 20c Composite blade
21, 21a, 21b, 21c Composite blade body
22, 22a, 22b, 22c Leading edge
23, 23a, 23b, 23c Leading edge section
26 Composite blade support member
30 Curved line
31, 32, 33 Point
41 First female mold
42 Second female mold
45, 46 Electrode
50c Metallic leading-edge cover forming unit

The invention claimed is:

1. A composite blade comprising:
a composite blade body including reinforced fibers and resin;
a metal layer provided on an outer side of a leading edge section including a leading edge that is a part of the composite blade body on an upstream side of an air stream, the metal layer having a thickness of equal to or larger than 5 micrometers and equal to or smaller than 100 micrometers;
an adhesive layer provided between the composite blade body and the metal layer to bond the metal layer to the composite blade body; and
an electric insulating layer provided in contact with a surface of the leading edge section of the composite blade body, the surface being on the side on which the metal layer is provided, the electric insulating layer having an electric insulating property,
wherein the metal layer includes at least one of a hard metal layer having a higher HV value than a soft metal and a super-hard metal layer having a higher HV value than the hard metal layer,
the hard metal layer is a Ni alloy plating layer, and
the super-hard metal layer is a hard Cr plating layer.

2. The composite blade according to claim 1, wherein
the metal layer includes both the hard metal layer and the super-hard metal layer, and
the super-hard metal layer is formed on at least a part of an outer side of the hard metal layer.

3. The composite blade according to claim 1, wherein the metal layer further includes a soft metal layer including the soft metal on a side on which the composite blade body is provided.

4. The composite blade according to claim 3, wherein the soft metal layer is a Cu plating layer or a pure Ni plating layer.

5. The composite blade according to claim 1, wherein an outer surface of the metal layer and an outer surface of an interface portion between the composite blade body and the metal layer each have a continuous surface.

\* \* \* \* \*